US008804659B2

United States Patent
Murakami et al.

(10) Patent No.: US 8,804,659 B2
(45) Date of Patent: Aug. 12, 2014

(54) COMMUNICATION TERMINAL, METHOD FOR CONTROLLING COMMUNICATION TERMINAL

(75) Inventors: Shingo Murakami, Kanagawa (JP); Robert Skog, Hässelby (SE); Toshikane Oda, Tokyo (JP)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 798 days.

(21) Appl. No.: 12/594,682

(22) PCT Filed: Apr. 5, 2007

(86) PCT No.: PCT/JP2007/058020
§ 371 (c)(1),
(2), (4) Date: Mar. 19, 2010

(87) PCT Pub. No.: WO2008/129633
PCT Pub. Date: Oct. 30, 2008

(65) Prior Publication Data
US 2010/0181373 A1    Jul. 22, 2010

(51) Int. Cl.
*H04W 4/00* (2009.01)
*H04W 36/36* (2009.01)

(52) U.S. Cl.
CPC .................................. *H04W 36/365* (2013.01)
USPC ........................................................ 370/331

(58) Field of Classification Search
CPC .................................................. H04W 36/365
USPC ........................................................ 370/331
See application file for complete search history.

(56) References Cited

U.S. PATENT DOCUMENTS

| 2003/0007497 | A1* | 1/2003 | March et al. ................. 370/410 |
| 2004/0002305 | A1* | 1/2004 | Byman-Kivivuori et al. ............ 455/41.2 |
| 2004/0205191 | A1 | 10/2004 | Smith et al. |
| 2005/0201543 | A1 | 9/2005 | Light et al. |
| 2005/0262548 | A1* | 11/2005 | Shimojo et al. ............... 725/135 |
| 2006/0026288 | A1* | 2/2006 | Acharya et al. ............... 709/227 |
| 2006/0155839 | A1 | 7/2006 | Hundscheidt et al. |
| 2007/0032225 | A1* | 2/2007 | Konicek et al. ............... 455/417 |
| 2007/0189220 | A1* | 8/2007 | Oberle et al. ................. 370/331 |
| 2007/0201480 | A1* | 8/2007 | Bao et al. ................... 370/395.2 |

(Continued)

FOREIGN PATENT DOCUMENTS

| JP | 2003-304251 A | 10/2003 | | |
| JP | 2004-240906 A | 8/2004 | | |
| WO | WO 2006/134803 | * 12/2006 | ............ | H04M 11/00 |
| WO | WO 2007/026914 | * 3/2007 | ............ | H04M 11/00 |

OTHER PUBLICATIONS

Rosenberg et al, RFC 3261, 2002, IETF.*

(Continued)

*Primary Examiner* — Mark Rinehart
*Assistant Examiner* — Christopher R Crompton (57) ABSTRACT

A communication terminal comprising an establishing means for establishing a communication session with a communication node by sending a request for establishment to the communication node is provided. The communication terminal further comprises an obtaining means for obtaining a first identifier from an object that is associated with an alternative communication terminal. The first identifier identifies the alternative communication terminal. The communication terminal further comprises a redirecting means for redirecting the communication session to the alternative communication terminal by sending a request for redirection to the communication node. The request for redirection includes the first identifier.

19 Claims, 9 Drawing Sheets

(56) References Cited

U.S. PATENT DOCUMENTS

| | | |
|---|---|---|
| 2009/0055537 A1 | 2/2009 | Takei et al. |
| 2009/0206986 A1* | 8/2009 | Murakami et al. ............. 340/5.8 |
| 2010/0121961 A1* | 5/2010 | Elleuch et al. ................ 709/228 |
| 2010/0303065 A1* | 12/2010 | Low et al. ..................... 370/352 |

OTHER PUBLICATIONS

Diagne, et al: "Extension of Service Location Protocol for IPv6 Communication Mobility". 2001 IEEE Pacific Rim Conference on Communications, Computers and Signal Processing. Aug. 2001. XP010560398.

Shacham, R et al. The Virtual Device Expanding Wireless Communication Services Through Service Discovery and Session Mobility. Wireless and Mobile Computing, Networking, and Communications, 2005. Aug. 22-24, 2005. IEEE.

Scott, D et al. Using Visual Tags to Bypass Bluetooth Device Discovery. Mobile Computing and Communications. Jan. 1, 2005.

Okugawa, T et al. A Home Network Service Environments for Wide-Area Communications. 2005 Asia-Pacific Conference on PERTH. Oct. 3-5, 2005.

Mineno, et al. A Study on I/O Device Control within mPAN for Home Network Environment. Multimedia, Distributed, Cooperative and Mobile Symposium. 2005.

* cited by examiner

```
REGISTER sip: server.@op.net SIP/2.0
Call-ID: 090793916e873c8a1bf8fe1a4960@10.0.0.5
CSeq : 1 REGISTER
From:  sip: tv@op.net ;tag =1109
To:  sip: tv@op.net;  UniqueNumber=912687
Via: SIP/2.0/UDP 10.0.0.5:5060;branch=
Max-Forwards: 70
Expires: 700000
Contact: <sip:  tv@10.0.0.5:5060>
Content-Length: 0
```

FIG. 8

```
INVITE sip:server@op.net;UniqueNumber=912687 SIP/2.0
Via: SIP/2.0/UDP 192.168.0.5:5060; branch=z9hG4bK9h9ab
Max-Forwards: 70
From: < sip:UserA@op.net  >; tag=r18f07667
To: <sip:912687@op.net>
Call-ID: ...
Cseq : ...
Contact: <sip:UserA@192.168.0.5>
Content-Type: application/ sdp
Content-Length: 180

...................
```

COMMUNICATION TERMINAL, METHOD FOR CONTROLLING COMMUNICATION TERMINAL

TECHNICAL FIELD

The present invention relates to a technology in which the communication terminal obtains another communication terminal's identifier as basis for session re-direction.

BACKGROUND

Communication terminals such as mobile phones and personal computers (PCs), etc. are well known. Such communication terminals are capable of establishing a communication session with a communication node such as a multimedia server, another communication terminal, etc. For example, a mobile phone user can view a movie by establishing a video streaming session between their mobile phone and a streaming video server.

A situation can arise in which a user would like to redirect their ongoing communication session to another communication terminal. For example, a user returns home and would like to redirect their ongoing streaming video session from their mobile phone to their home PC in order to watch the movie on a larger display. Similarly, when a user leaves home, the user may wish to redirect their ongoing communication session from their home PC to their mobile phone in order to continue viewing a movie after leaving.

In order to perform such communication session redirection, the user must inform the streaming video server of the new target communication terminal. For example, in the case of communication terminals using the Session Initiation Protocol (SIP), if the ongoing communication session was initiated by means of SIP, the user can redirect the session by sending a SIP INVITE message with the target terminal's SIP URI (Universal Resource Identifier) to the streaming video server.

However, to do so the user must know the target terminal's SIP URI and send it to the streaming video server. This is cumbersome for the user for several reasons.

There is no standard way for the user to know the SIP URI of the target terminal. For example, some PCs may present a SIP URI on the display when the user clicks on a dedicated icon; some SIP-enabled Personal Digital Assistants (PDAs) may present a SIP URI when the user pushes a dedicated button. These varying processes significantly degrade usability in finding the SIP URIs of the target terminals since the user must know in advance how to locate the SIP URI for each target terminal to be used, and then take action to manipulate the target terminal in order to retrieve the SIP URI.

After the user has retrieved the SIP URI of the target terminal, cumbersome manual operations are still required for the user to input the SIP URI of the target terminal into the originating terminal. These operations are especially cumbersome, for example, when a mobile phone, which may have a crude input device, serves as the originating terminal.

Input operations of the SIP URI may be simplified if the user registers, in advance, the SIP URIs of frequently-used target terminals in, for example, an electronic phonebook. However, the user must still perform cumbersome manual operations to open the phonebook, search for and select the entry of the target terminal— requiring, for example, button-based menu navigation on a mobile phone. Moreover, if arbitrary terminals located in public spaces (e.g., cafeterias, shops, stations, museums, etc.) are to serve as target terminals, the electronic phonebook will not work effectively because the user cannot know the SIP URI of these terminals in advance and is thus forced to repeat manual input whenever the user wishes to use them.

SUMMARY

The feature of the present invention is to solve the pre-existing problem.

According to an aspect of the present invention, there is provided a communication terminal comprising an establishing means for establishing a communication session with a communication node by sending a request for establishment to the communication node. The communication terminal further comprises an obtaining means for obtaining a first identifier from an object that is associated with an alternative communication terminal. The first identifier identifies the alternative communication terminal. The communication terminal further comprises a redirecting means for redirecting the communication session to the alternative communication terminal by sending a request for redirection to the communication node. The request for redirection includes the first identifier.

According to another aspect of the present invention, there is provided a communication terminal comprising an establishing means for establishing a communication session with a communication node, the communication session being redirected from an originating communication terminal. The communication terminal further comprises an object which provides the originating communication terminal with a first identifier which identifies the communication terminal.

According to another aspect of the present invention, there is provided a method for controlling a communication terminal comprising an establishing step of establishing a communication session with a communication node by sending a request for establishment to the communication node. The method further comprises an obtaining step of obtaining a first identifier from an object that is associated with an alternative communication terminal. The first identifier identifies the alternative communication terminal. The method further comprises a redirecting step of redirecting the communication session to the alternative communication terminal by sending a request for redirection to the communication node. The request for redirection includes the first identifier.

The main advantage of the present invention is as follows. When a user wishes to redirect an ongoing communication session from the communication terminal currently being used to an alternative communication terminal, the cumbersome operations which are caused by the user needing to know and input the terminal identifier of the alternative communication terminal are dramatically reduced because the communication terminal obtains the identifier from an object which is associated with the alternative communication terminal.

Further features of the present invention will become apparent from the following description of exemplary embodiments with reference to the attached drawings, in which like reference characters designate the same or similar parts throughout the figures thereof.

DETAILED DESCRIPTION

Hereinafter, preferred embodiments of the present invention will be described. In the embodiments, it is assumed that each entity (e.g., a mobile phone, PC, a streaming video server, etc.) is SIP-enabled and they are connected to a network capable of carrying SIP control messages. Herein we will refer to such a network as a "SIP network". It should be noted that the concept of the present invention can be applied to any type of communication network in which each entity can be identified by some sort of identifier and the ongoing communication session can be redirected from one entity to another entity.

Figure 1:
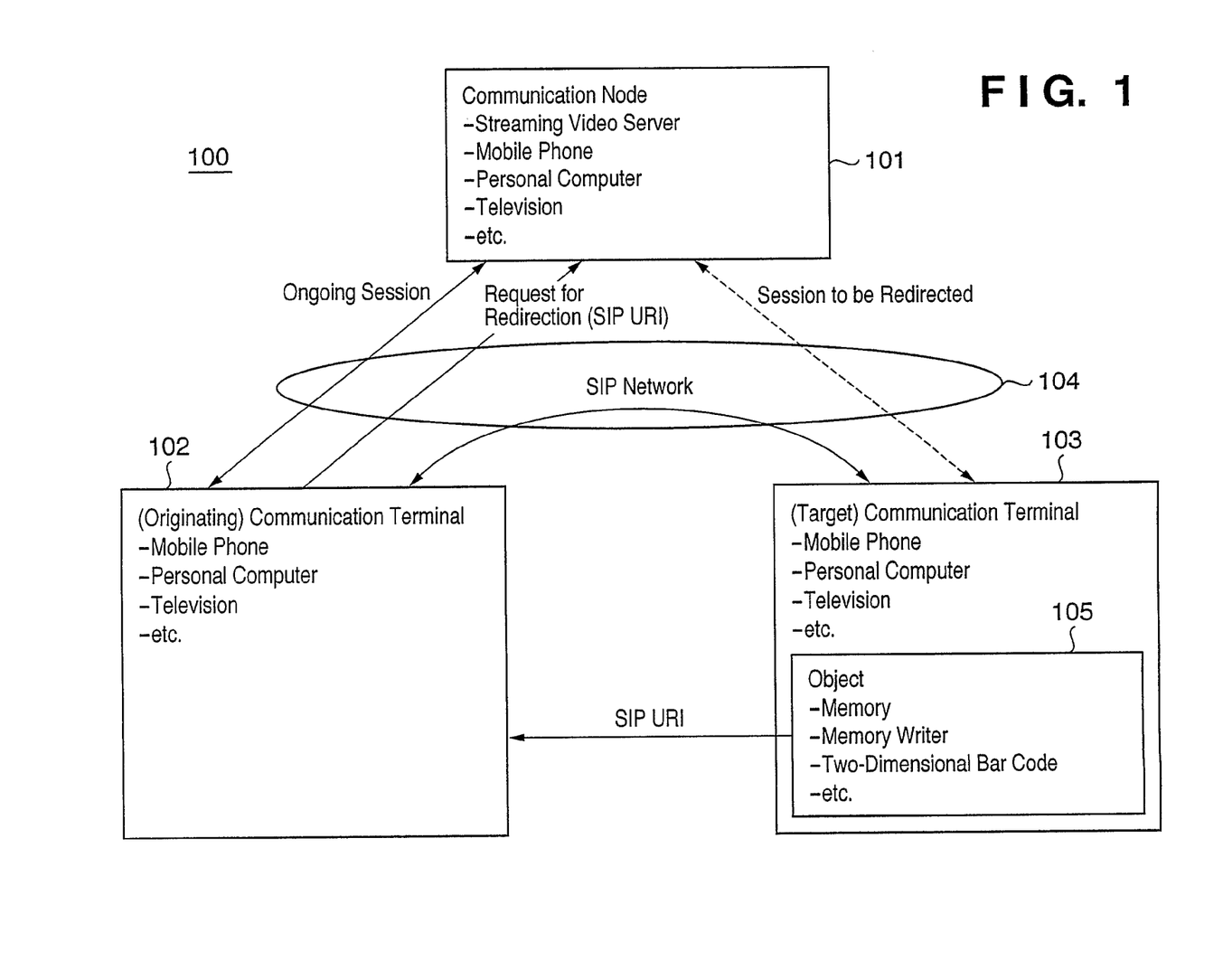
FIG. 1 illustrates an overview of the communication system according to the embodiment.

FIG. 1 illustrates an overview of a communication system 100 according to the embodiment. The communication system 100 comprises a communication node 101 and communication terminals 102 and 103, and they can communicate with each other via the SIP network 104.

The communication node 101 may be any type of SIP-enabled device such as a streaming video server, a mobile phone, a personal computer (PC), a television (TV), etc.

The communication terminals 102 and 103 may be SIP-enabled devices of any type (e.g., a mobile phone, PC, TV, etc.). In the present embodiment, it is assumed that the communication terminal 102 has an ongoing (i.e., established) communication session with the communication node 101, and redirects the ongoing communication session to the communication terminal 103. In other words, the communication terminal 102 is an originating terminal and the communication terminal 103 is a target terminal.

In the communication system 100, there is an object 105 associated with the communication terminal 103. The object 105 may be a memory, a memory writer, an image (e.g. two-dimensional bar code), etc. The object 105 may be built into the communication terminal 103, or it may be external to the communication terminal 103. For example, the object 105 may be two-dimensional bar code that is printed, for example, on paper, and this paper may be affixed to the communication terminal 103. Alternatively, this paper may be placed separately from the communication terminal 103 as long as the user can recognize the association between the paper (the object 105) and the communication terminal 103.

To perform session redirection, the communication terminal 102 obtains the SIP URI of the communication terminal 103 from the object 105. For example, if the object 105 is a memory in which the SIP URI of the communication terminal 103 is stored, the communication terminal 102 may have a memory reader and obtain the SIP URI via the memory reader. Alternatively, if the object 105 is a memory writer, the communication terminal 102 may have a memory and obtains the SIP URI when the memory writer writes the SIP URI on the memory. Alternatively, if the object 105 is a two-dimensional bar code, the communication terminal 102 may have a camera and obtain the SIP URI by capturing the two-dimensional bar code as image data, e.g. presented at a display of terminal 103, and then converting it into text data.

Since the communication terminal 102 is capable of obtaining the SIP URI of the communication terminal 103 via the object 105, cumbersome operations requiring the user to know and input a SIP URI are reduced.

After acquisition of the SIP URI, the communication terminal 102 can redirect the session using any of the known technologies for doing so. For example, via the SIP network 104, the communication terminal 102 may send a SIP INVITE message to the communication terminal 103 and thereby receives a Session Description Protocol (SDP) message describing the capabilities and session initialization of a device (hereinafter, "an SDP message") of the communication terminal 103. Then, using SDP, the communication terminal 102 sends to the communication node 101 a ReINVITE message, which includes the SIP URI of the communication terminal 103, as a request for redirection. Finally, the communication node 101 stops the ongoing session and establishes the new session (i.e., the redirected session) with the communication terminal 103.

While no technical distinction need exist between them, for purposes of clarity, herein a distinction is drawn between a "communication terminal", referring to a device which initiates communication session redirection and/or receives the redirected session, and a "communication node", referring to the device with which the communication terminal is communicating. Communication nodes and communication terminals may share the same functionality and in some cases may be the same devices.

Figure 2:
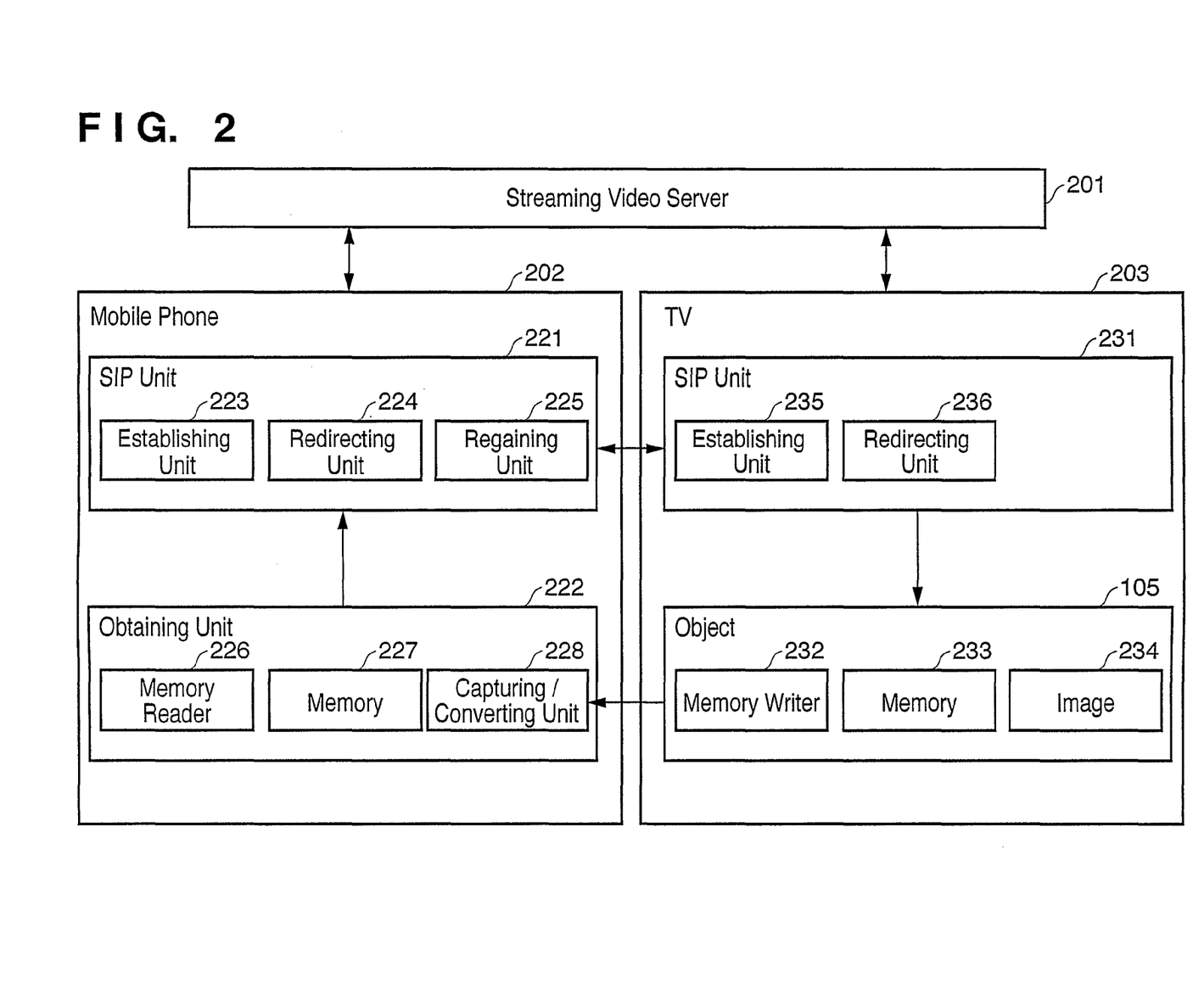
FIG. 2 illustrates an exemplary configuration of the communication system according to the embodiment.

Hereinafter, the embodiment is described in more detail with reference to FIG. 2. In FIG. 2, it is assumed that the communication node 101 is a streaming video server 201, the communication terminal 102 is a mobile phone 202, and the communication terminal 103 is a TV 203.

It should be noted that the components contained in the mobile phone 202 and the TV 203 are typically implemented by a combination of hardware and software (i.e., computer programs executed by the processor (not shown)), but they may also be implemented in dedicated hardware.

The mobile phone 202 comprises a SIP unit 221 and an obtaining unit 222. The TV 203 comprises a SIP unit 231 and an object 105, although the object 105 may be external to the TV 203, as described above. The streaming video server 201, the SIP unit 221, and the SIP unit 231 can communicate with each other via SIP network 104 (not shown in FIG. 2).

The SIP unit 221 comprises an establishing unit 223 and a redirecting unit 224.

The establishing unit 223 establishes a video streaming session with the streaming video server 201 by sending a request for establishment, which typically includes a SIP INVITE message, to the streaming video server 201. Details of the session establishment process will be explained later with reference to FIG. 3.

The redirecting unit 224 redirects the established session to the TV 203 by sending a request for redirection, which typically includes a SIP ReINVITE message, to the streaming video server 201. Details of the session redirection process will be explained later with reference to FIG. 4.

The SIP unit 221 may also comprise a regaining unit 225. The regaining unit 225 regains the redirected session from the TV 203 by sending a regaining request, which typically includes a SIP ReINVITE message, to the streaming video server 201. Details of the session regaining process will be explained later with reference to FIG. 5.

The obtaining unit 222 obtains the SIP URI of the TV 203 from the object 105. Implementation of the obtaining unit 222 varies depending upon the implementation of the object 105, and vice versa. For example, the obtaining unit 222 may comprise a memory reader 226, and the object 105 may comprise a memory 233 in which the SIP URI of the TV 203 is stored. In this case, the SIP unit 231 writes the SIP URI of the TV 203 on the memory 233, and the memory reader 226 retrieves the SIP URI from the memory 233. When the SIP URI of the TV 203 changes, the SIP unit 231 may update the content of the memory 233.

Alternatively, the obtaining unit 222 may comprise a memory 227, and the object 105 may comprise a memory writer 232. In this case, the memory writer 232 writes the SIP URI of the TV 203, which has been received from the SIP unit 231, to the memory 227.

Alternatively, the obtaining unit 222 may comprise a capturing/converting unit 228, and the object 105 may comprise an image 234, which represents the SIP URI of TV 203. The image 234 may be a bar code, a two-dimensional bar code, text representing the SIP URI, etc. In this case, the capturing/converting unit 228, which may comprise a camera, captures the image 234 as image data. Then, the capturing/converting unit 228 converts the image data into the SIP URI. In case that the image 234 is text representing the SIP URI, for example, the capturing/converting unit 228 may comprise Optical Character Reader (OCR) functionality, which converts text into electronic form. The image 234 may be printed on paper in advance. Alternatively, the processor (not shown) of the TV 203 may generate the image 234 and display it on the display (not shown) of the TV 203. In this case, when the SIP URI of TV 203 changes, the image 234 can be updated. In some embodiments, the capturing/converting unit 228 may capture the image of the target communication terminal itself. In this case, the capturing/converting unit 228 identify the target communication terminal by performing any known image recognition process, and obtains the SIP URI based on the result of the image recognition, for example from a database.

After the obtaining unit 222 obtains the SIP URI of the TV 203, the redirecting unit 224 receives the SIP URI from the obtaining unit 222 and redirects the ongoing session to the TV 203.

In some embodiments, the object 105 may include status information (e.g. "free" or "busy") which indicates whether or not the TV 203 accepts the session redirection initiated by the redirecting unit 224. For example, if the TV 203 has already had an established communication session, the status information may be "busy". The obtaining unit 222 obtains the status information as well as the SIP URI from the object 105, and the redirecting unit 224 redirects the ongoing session to the TV 203 if the status information indicates that the TV 203 accepts the session redirection (i.e., "free"). As described above, the object 105 may comprise the image 234 (a bar code, a two-dimensional bar code, etc.) and may be displayed on the display (not shown) of the TV 203. In this case, the TV 203 may infer the status information by displaying the image 234 only when the TV 203 accepts the session redirection (i.e., "free"). If the image 234 is not displayed, the user of the mobile phone 202 may aware that the TV 203 will not accept the session redirection.

The SIP Unit 231 comprises an establishing unit 235. The establishing unit 235 establishes a communication session, which is redirected from the mobile phone 202, with the streaming video server 201.

The SIP Unit 231 may also comprise a redirecting unit 236 that redirects (returns) the redirected session to the mobile phone 202. In the present embodiment, the redirection by the redirecting unit 236 is triggered by a BYE message sent from the regaining unit 225 (see FIG. 5).

The salient feature of the implementation of the aforedescribed obtaining unit 222 and object 105 is that, in contrast with conventional solutions, only a few operations are required for the user of the mobile phone 202 to obtain the SIP URI of the TV 203 and input it into the SIP unit 221. Accordingly, the user is relieved from the cumbersome operations encountered with conventional solutions when redirecting the ongoing session to an alternative communication terminal.

It should be noted that other implementations of the obtaining unit 222 and the object 105 are also possible as long as the reduction in user operations is maintained.

Hereinafter, the detailed processes of session establishment, session redirection and session regaining are described with reference to FIGS. 3-5. In the present embodiment, it is assumed that Third Party Call Control (3PCC) [1] is employed, but other technologies may also be employed.

Figure 3:
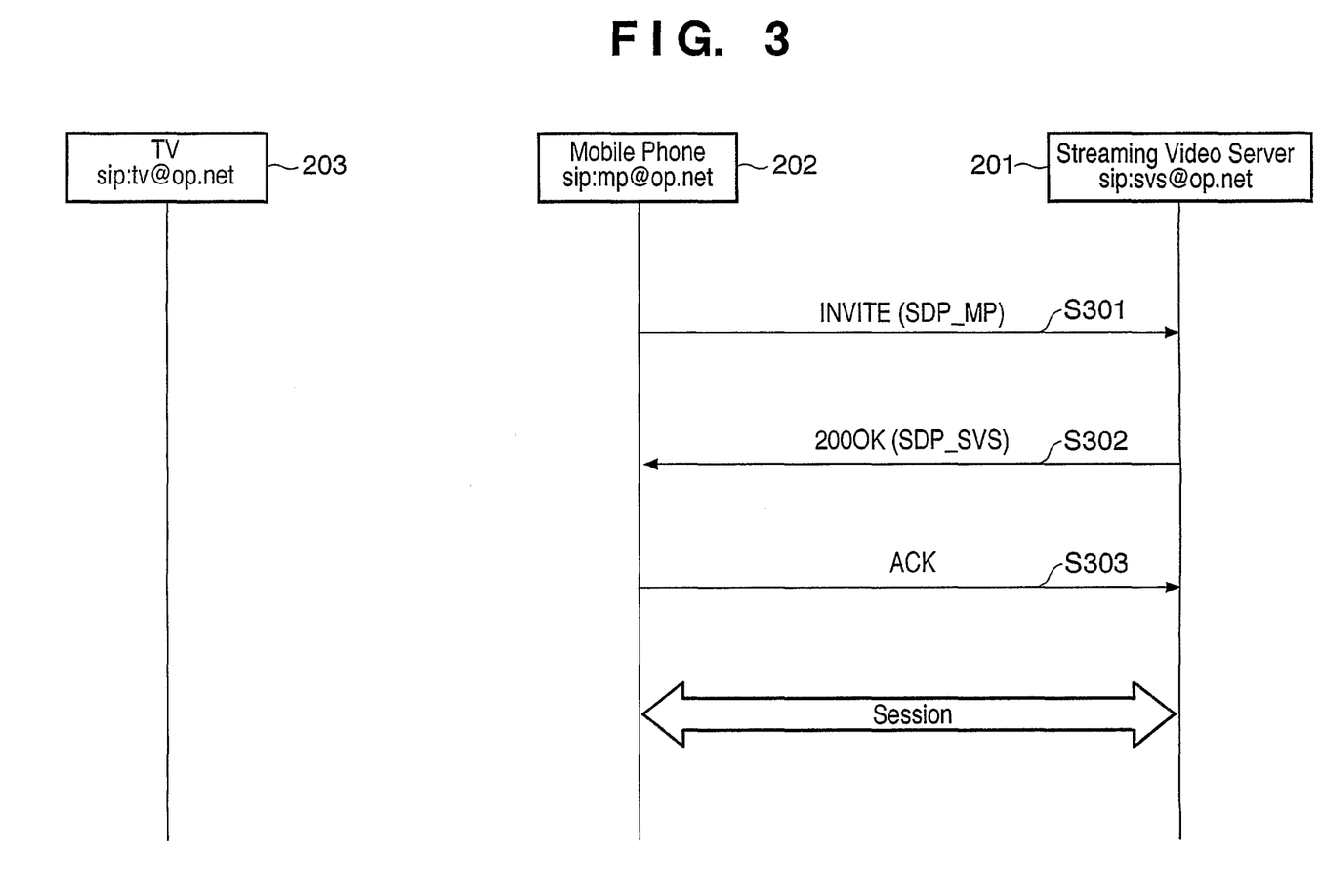
FIG. 3 is a sequence diagram showing the process of establishing the communication session between a mobile phone and a streaming video server.
Figure 4:
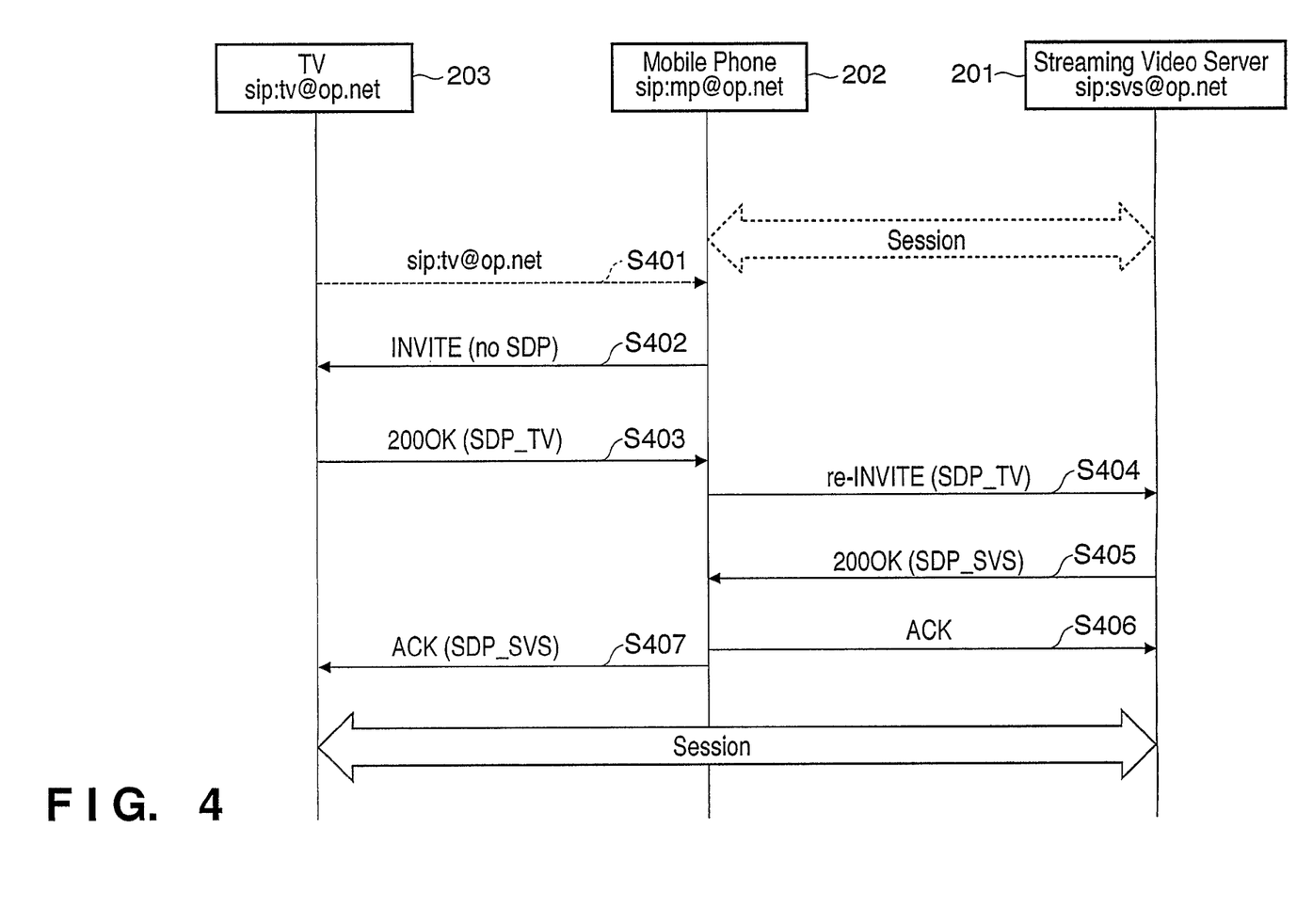
FIG. 4 is a sequence diagram showing the process of redirecting the communication session, which is established in FIG. 3, from a mobile phone to a TV.
Figure 5:
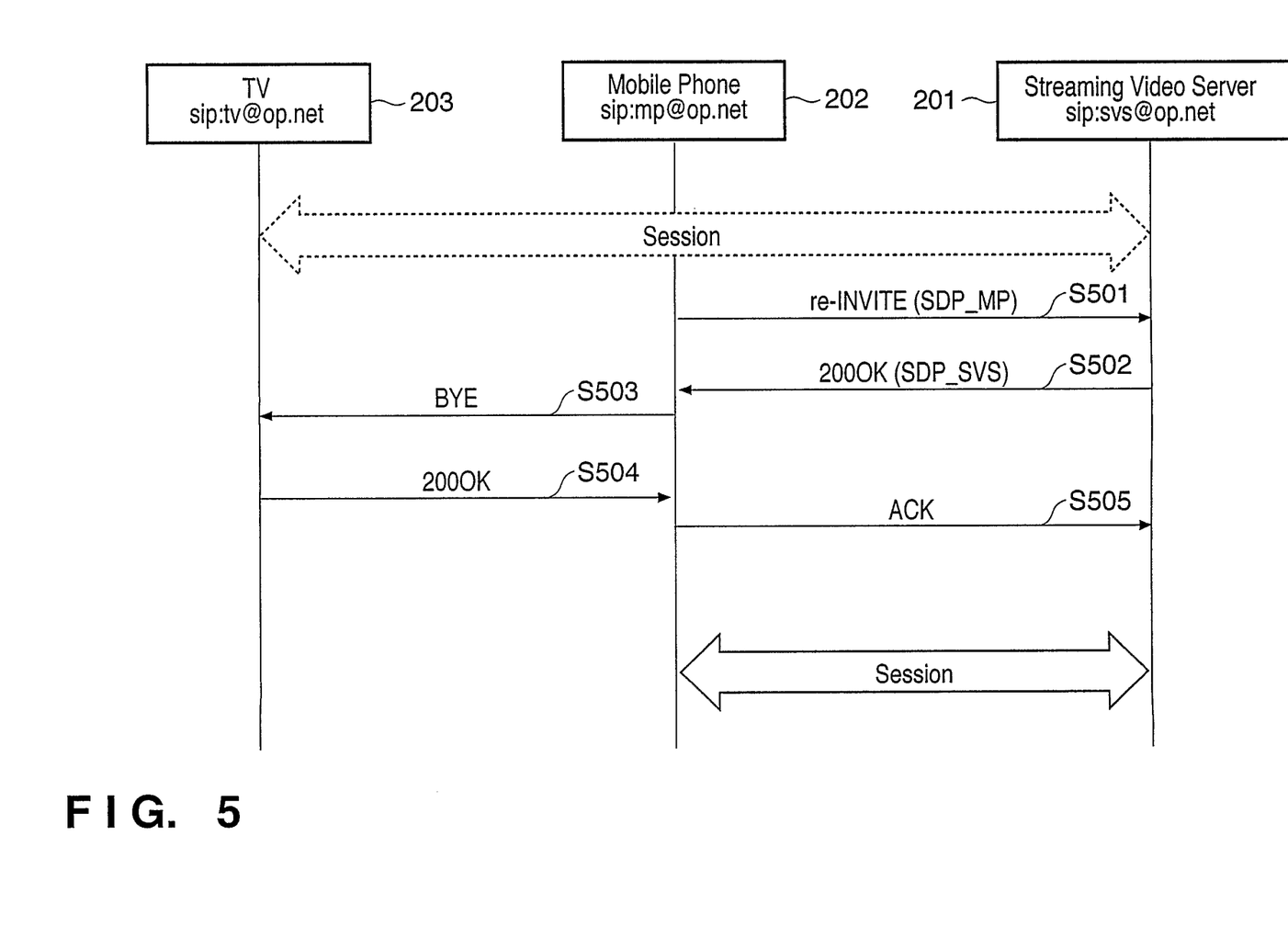
FIG. 5 is a sequence diagram showing the process in which a mobile phone regains the communication session, which is redirected in FIG. 4, from a TV.

In FIGS. 3-5, it is assumed that the streaming video server 201 has SIP URI "svs@op.net", the mobile phone 202 "mp@op.net", and the TV 203 "tv@op.net".

FIG. 3 is a sequence diagram showing the process of establishing the communication session (video streaming session) between the mobile phone 202 and the streaming video server 201.

In step S301, the establishing unit 223 of the mobile phone 202 sends a SIP INVITE message to the streaming video server 201. The SIP INVITE message includes an SDP message describing the mobile phone 202.

In step S302, the streaming video server 201 returns a 200 OK message, which includes an SDP message describing the streaming video server 201, to the establishing unit 223.

In step S303, the establishing unit 223 sends an ACK message to the streaming video server 201, and the communication session is then established.

FIG. 4 is a sequence diagram showing the process of redirecting the communication session, which is established in FIG. 3, from the mobile phone 202 to the TV 203.

In step S401, the obtaining unit 222 obtains the SIP URI of the TV 203 from the object 105.

In step S402, the redirecting unit 224 sends an INVITE message to the TV 203, which is identified by the SIP URI obtained in step S401. The process in this step may be triggered by the acquisition of the SIP URI in step S401, or may be triggered by a user operation on the mobile phone 202.

In step S403, the TV 203 returns a 200 OK message, which includes an SDP message describing the TV 203, to the redirecting unit 224. In some embodiments, the SDP message may include the state (i.e., "free" or "busy") of the TV 203.

In step S404, the redirecting unit 224 sends a ReINVITE message to the streaming video server 201, including in it the SDP message received in step S403.

In step S405, the streaming video server 201 returns a 200 OK message to the redirecting unit 224, including in it an SDP message description of the streaming video server 201.

In step S406, the redirecting unit 224 returns an ACK message to the streaming video server 201, and in step S407, the redirecting unit 224 returns an ACK message to the TV 203, including in it the SDP message received in step S405. The communication session is then redirected from the mobile phone to the TV 203. In other words, the (redirected) communication session is established between the streaming video server 201 and the TV 203. Note the mobile phone 202 still maintains two SIP dialogs; one is between the mobile phone 202 and the streaming video server 201 and the other is between the mobile phone 202 and the TV 203. These SIP dialogs are necessary for the mobile phone 202 to regain the redirected communication session afterward as described in FIG. 5.

FIG. 5 is a sequence diagram showing the process in which the mobile phone 202 regains from the TV 203, the communication session, which was redirected in FIG. 4.

In step S501, the regaining unit 225 sends a ReINVITE message to the streaming video server 201 within the maintained SIP dialog between the mobile phone 202 and the streaming server 201, including in it an SDP message describing the mobile phone 202. The SDP message includes the SIP URI of the mobile phone 202. The process in this step may be triggered, for example, by user operation of the mobile phone 202.

In step S502, the streaming video server 201 returns a 200 OK message to the regaining unit 225, including in it the SDP message describing the streaming video server 201.

In step S503, the regaining unit 225 sends a BYE message to the TV 203 within the maintained SIP dialog between the mobile phone 202 and the TV 203.

In step S504, the TV 203 returns a 200 OK message to the regaining unit 225. At this time, the SIP dialog between the mobile phone 202 and the TV 203 is terminated.

In step S505, the regaining unit 225 returns an ACK message to the streaming video server 201. The communication session is then re-established between the streaming video server 201 and the mobile phone 202. In other words, the mobile phone 202 regains the communication session, which was redirected in FIG. 4.

In the embodiment described above, the mobile phone 202 and the TV 203 directly send and receive messages (e.g., INVITE, ACK, etc.); likewise, the mobile phone 202 and the streaming video server 201 also directly send and receive messages.

However, it should be noted, for example, that an entity (e.g., an IMS (IP Multimedia Subsystem) application server), which functions as a Back-to-Back User Agent (B2BUA) may be introduced. In this case, the redirecting unit 224 sends a ReINVITE message to the INS application server in order to redirect the ongoing session.

In other words, the messages shown in FIGS. 3-5 are not necessarily communicated directly between the streaming video server 201, the mobile phone 202, and the TV 203; they may be communicated indirectly via another entity. In this case, the content and the sequence of the messages may be modified to suit the implementation of the entity introduced.

In some embodiments, the obtaining unit 222 obtains a type of identifier for the TV 203 distinct from the SIP URI. The identifier may, for example, be a number uniquely associated with each communication terminal (hereinafter, "unique number"), the MAC (Media Access Control) address of the communication terminal, etc.

This embodiment is advantageous in that the user cannot obtain the SIP URI of the TV 203 directly from the TV 203 identifier. This is because unrestricted disclosure of the SIP URIs of communication terminals to other terminals may lead malicious accesses (attacks) on the communication terminals. Accordingly, this embodiment improves the security of the communication system 100 (see FIG. 1).

This embodiment is also advantageous when the object 105 can only provide the obtaining unit 222 with a relatively limited amount of information. For example, a one-dimensional bar code usually cannot be made to store enough information to represent any possible SIP URI, but a one-dimensional bar code can be made to store enough information to represent all possible numbers in the communication system 100.

Figure 6:
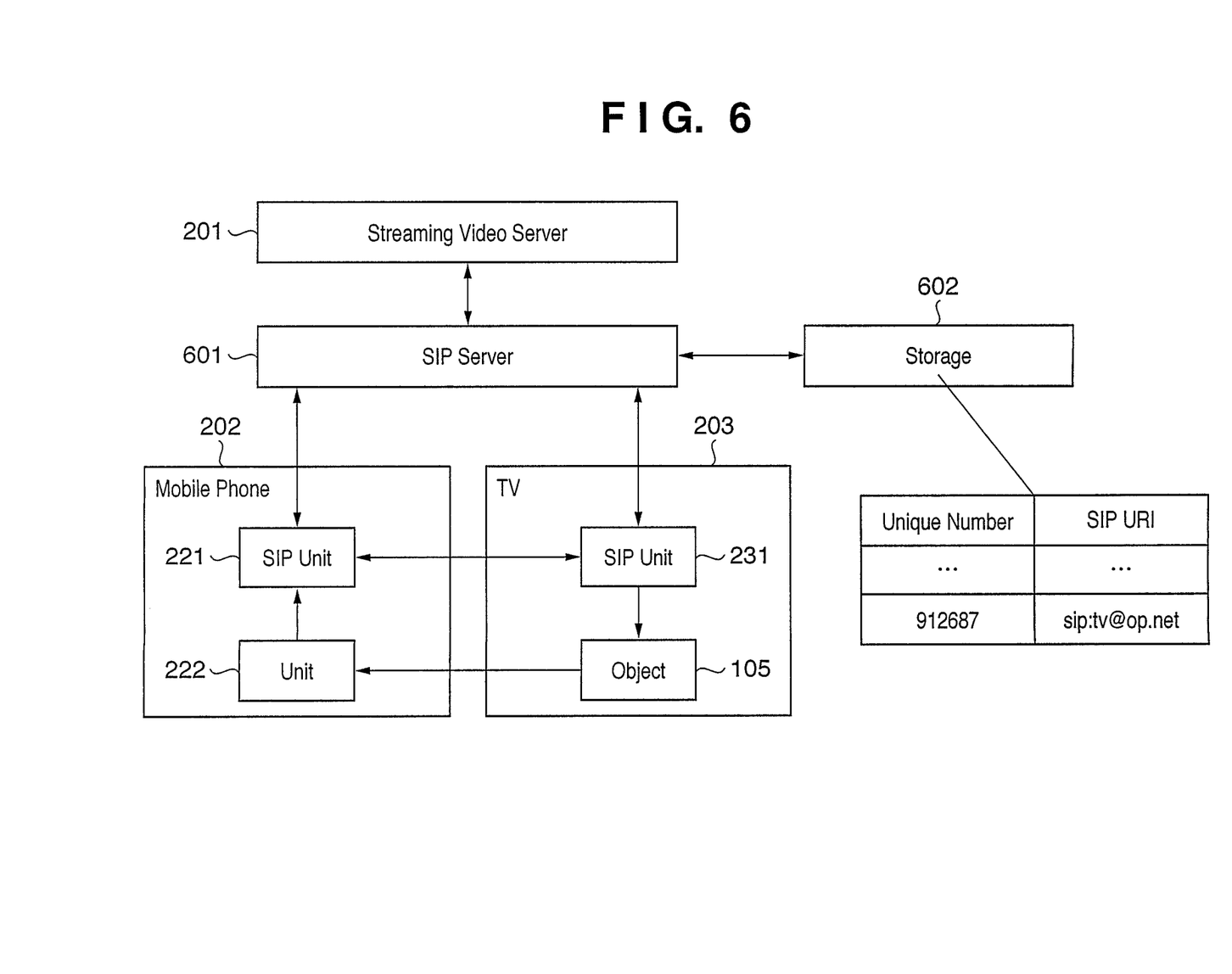
FIG. 6 illustrates another exemplary configuration of the communication system according to the embodiment.

Hereinafter, this embodiment is described with reference to FIG. 6, where it is assumed that a unique number is used as an identifier for explanatory purposes.

A SIP server 601 works as a B2BUA and translates the unique numbers into SIP URIs by accessing a storage 602.

The storage 602 stores the unique numbers in association with the SIP URIs of each communication terminal such as the TV 203.

It should be noted that the storage 602 may be built into the SIP server 601.

Figure 7:
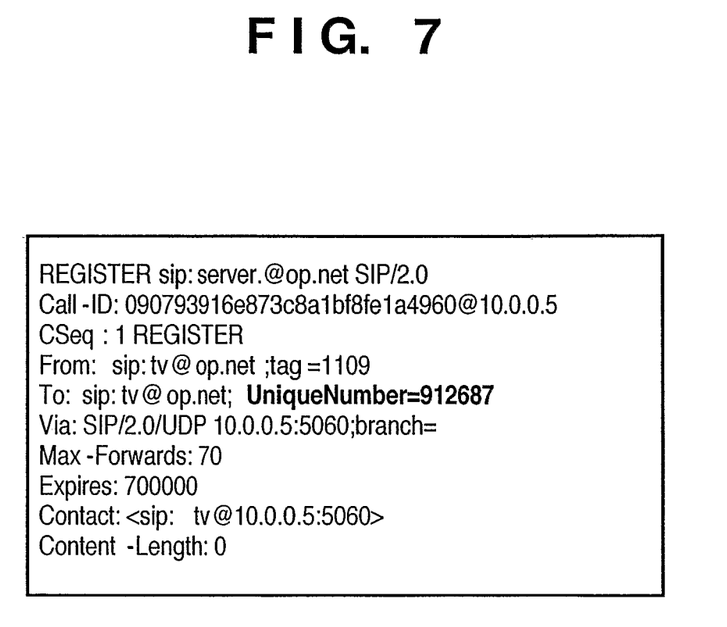
FIG. 7 illustrates an example of a SIP REGISTER message sent by the TV.

The unique number is, for example, generated in the TV 203 and stored in the storage 602 when the TV 203 is registered with the SIP server 601. FIG. 7 illustrates an example of a SIP REGISTER message sent by the TV 203. As shown, the unique number 912687 is suffixed to the SIP URI of the TV 203. Alternatively, the SIP REGISTER message may have a dedicated header (which represents the unique number), or the body of the SIP REGISTER message may include the unique number.

If this number has already been associated with another communication terminal in the storage 602, the SIP server 601 rejects the SIP REGISTER message. The TV 203 then generates another number (e.g., by using time as seed for a random number generator (not shown)) and sends another SIP REGISTER message to the SIP server 601.

Figure 8:
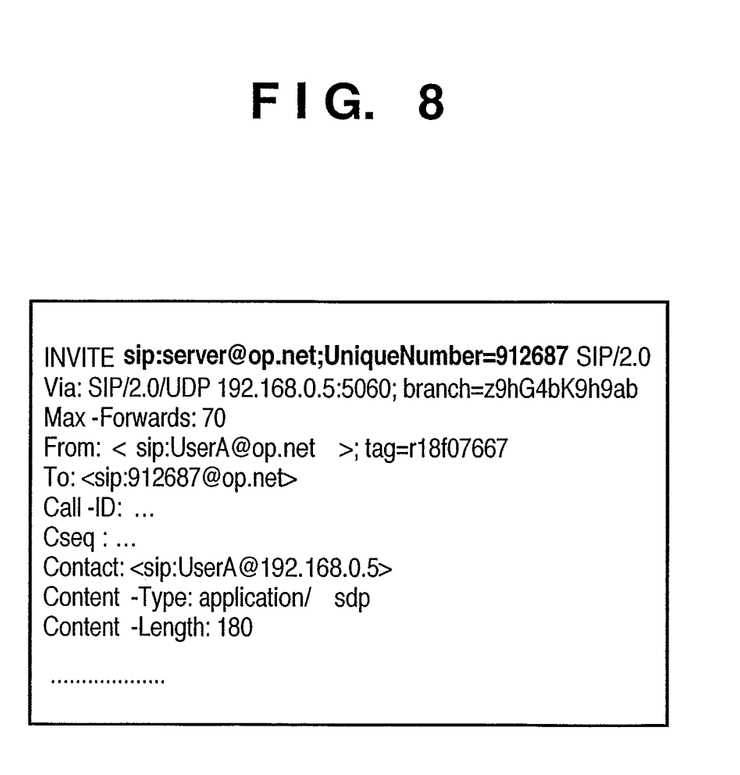
FIG. 8 illustrates an example of a SIP INVITE message sent by the mobile phone.

When the mobile phone 202 redirects the ongoing session to the TV 203, the obtaining unit 222 obtains the unique number ("912687") from the object 105, and the redirecting unit 224 sends a SIP INVITE message, which includes the unique number, to the SIP server 601 instead of the TV 203. FIG. 8 illustrates an example of a SIP INVITE message sent by the redirecting unit 224.

Then, the SIP server 601 retrieves the SIP URI of the TV 203 from the storage 602, and the redirection is performed.

In some embodiments, the obtaining unit 222 and the object 105 may be capable of Near Field Communication (NFC) [2]. In this case, because the user only need bring the mobile phone 202 within close range of the object 105 to obtain the identifier (e.g., a SIP URI, a unique number, etc.) of the TV 203, the number of user operations required to conduct session redirection can be dramatically reduced. In other words, if the obtaining unit 222 falls within communication range of an NFC-capable object 105 while the communication session is ongoing, the obtaining unit 222 may obtain the identifier of the TV 203 and the redirecting unit can redirect the ongoing session to the TV 203.

Figure 9:
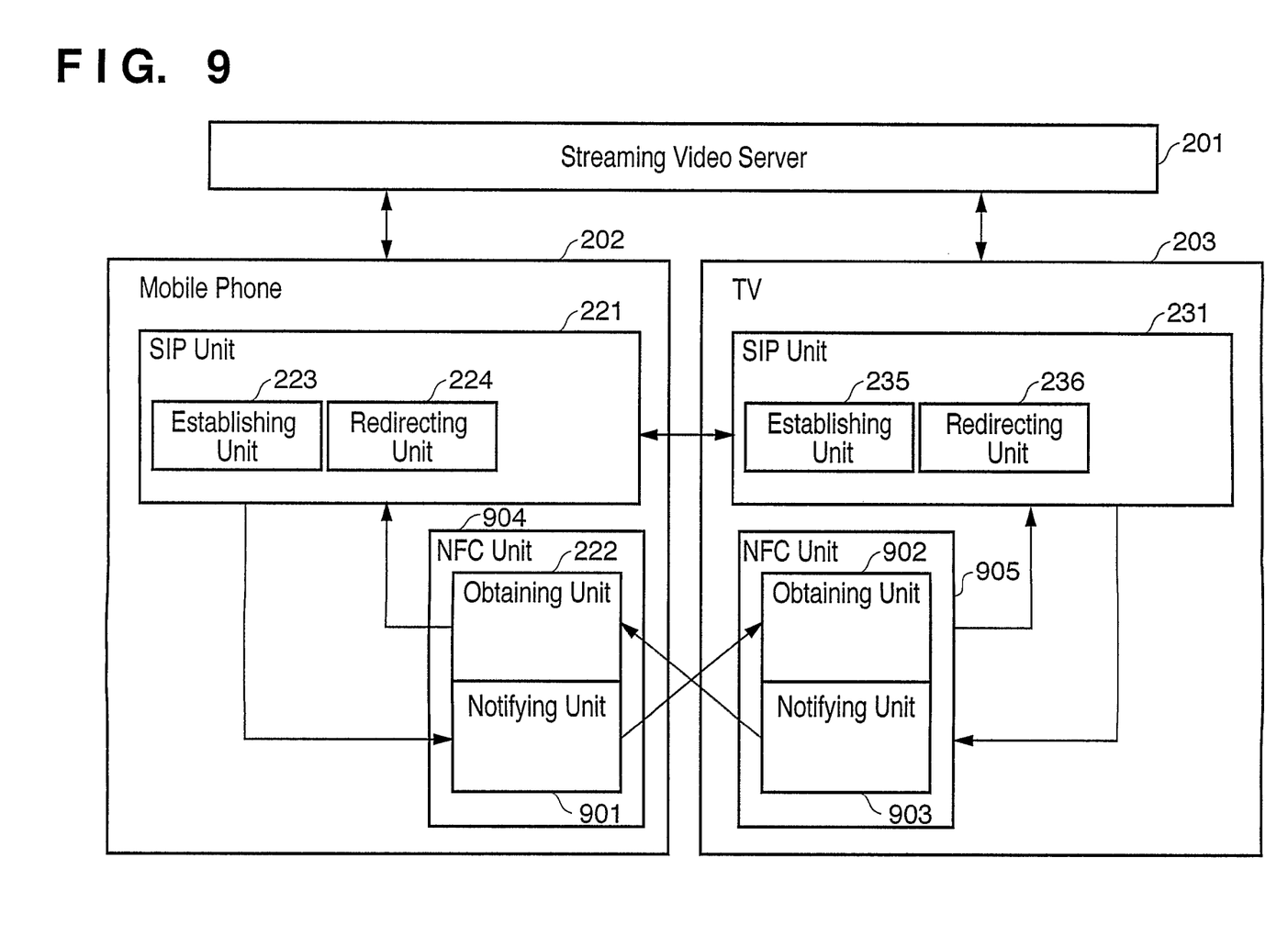
FIG. 9 illustrates yet another exemplary configuration of the communication system according to the embodiment.

Further, in some embodiments the mobile phone 202 comprises a notification unit 901, and the TV 203 comprises an obtaining unit 902 and a notifying unit 903 as shown in FIG. 9. The obtaining unit 222 obtains the identifier of TV 203 from the notifying unit 903 in conformance with NFC, and the obtaining unit 902 obtains the identifier of the mobile phone 202 from the notifying unit 901 in conformance with NFC. In other words, the obtaining unit 222 and the notifying unit 901 form an NFC unit 904. Also, the obtaining unit 902 and the notifying unit 903 form an NFC unit 905. The NFC unit 905 is one implementation of the object 105, and the NFC unit 904 is one implementation of an object which is associated with the mobile phone 202. The NFC units 904 and 905 exchange the identifier of the mobile phone 202 and the TV 203.

In this case, the TV 203 may know the identifier of the mobile phone 202 and the redirecting unit 236 redirects (returns) the redirected session to the mobile phone 202 by sending a request for return to the streaming video server 201. Accordingly, the mobile phone 202 can regain the redirected session without the regaining unit 225 (see FIG. 2). In other words, if the notifying unit 901 falls within NFC communication range with the obtaining unit 902 while the redirected communication session is ongoing, the notifying unit 901 notifies the obtaining unit 902 of the identifier of the mobile phone 202, and the redirecting unit 236 returns the redirected communication session to the mobile phone 202.

Furthermore, in the embodiment shown in FIG. 9, the TV 203 may initiate a communication session with the streaming video server 201 and redirect it to the mobile phone 202. In other words, communication terminals such as the mobile phone 202 and the TV 203 shown in FIG. 9 can handover ongoing communication sessions with each other any time they are brought within NFC communication range. Thereby, both the number and the cumbersome nature of the operations required for the user to initiate redirect (handover) communication sessions are drastically reduced.

In some embodiments, the NFC units 904 and 905 may be used for charging. For example, the NFC unit 904 is equipped with electronic money functionality. The TV 203 is set in the hotel room (or in the airplane, train, cyber café, etc.) and the hotel manager (or the airline company, the railway company, the cyber café manager, etc.) wishes to charge the user of the mobile phone 202 for the use of the TV 203. In this case, the NFC unit 905 may subtract the electronic money value of the NFC unit 904 when the obtaining unit 222 obtains the identifier of the TV 203 thereby charging is accomplished.

As described above, according to the present invention, the communication terminal (e.g., a mobile phone) comprises an obtaining unit (e.g., a memory reader) that obtains the identifier (e.g., a SIP URI) from an object (e.g., a memory), which is associated with another (alternative) communication terminal (e.g., a TV). After the acquisition of the identifier of the alternative communication terminal, the communication terminal redirects the ongoing communication session to the alternative communication terminal.

Accordingly, when the user wishes to redirect the ongoing communication session from the communication terminal to an alternative communication terminal, the cumbersome operations, which require the user to know and input the identifier of the alternative communication terminal, are dramatically reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

ABBREVIATIONS

PC Personal Computer
SIP Session Initiation Protocol
URI Universal Resource Identifier
PDA Personal Digital Assistant
SDP Session Description Protocol
OCR Optical Character Reader
3PCC Third Party Call Control
IMS IP Multimedia Subsystem
B2BUA Back-to-Back User Agent
MAC Media Access Control
NFC Near Field Communication

REFERENCES

[1] Best Current Practices for Third Party Call Control (3PCC), J. Rosenberg et al., RFC3725, 2004-04
[2] ISO/IEC 18092 Near Field Communication—Interface and Protocol (NFCIP-1), http://standards.iso.org/ittf/PubliclyAvailableStandards/c038578_ISO_IEC_18092_2004(E).zip

The invention claimed is:

1. A communication terminal, comprising:
establishing means for establishing a communication session with a communication node by sending a request for establishment to the communication node;
obtaining means for obtaining a first identifier from an object that is associated with an alternative communication terminal, said first identifier identifying the alternative communication terminal and said object comprising an image which represents the first identifier, wherein the obtaining means comprises:
capturing means for capturing the image as image data; and
converting means for converting the image data into the first identifier;
redirecting means for redirecting the communication session to the alternative communication terminal by:
obtaining, from the alternative communication terminal identified based on the first identifier, a first message that describes the alternative communication terminal,
sending a request for redirection to the communication node, said request for redirection including the first message,
receiving, from the communication node, a second message that describes capabilities and session initialization of the communication node, and sending the second message to the alternative communication terminal; and
regaining means for regaining the communication session from the alternative communication terminal by sending a regaining request to the communication node.

2. The communication terminal according to claim 1, wherein,
the object comprises a memory in which the first identifier is stored, and
the obtaining means comprises a memory reader which retrieves the first identifier from the memory.

3. The communication terminal according to claim 1, wherein the obtaining means comprises a memory, and the object comprises a memory writer which writes the first identifier to the memory.

4. The communication terminal according to claim 1, wherein the obtaining means further obtains status information from the object, the status information indicating whether or not the alternative communication terminal accepts session redirection by the redirecting means, and the redirecting means redirects the communication session to the alternative communication terminal if the status information indicates that the alternative communication terminal accepts the session redirection.

5. The communication terminal according to claim 1, further comprising notifying means for notifying the object of a second identifier which identifies the communication terminal, wherein the obtaining means obtains the first identifier from the object in conformance with Near Field Communication (NFC), the notifying means notifies the object of the second identifier in conformance with NFC, the redirecting means redirects the communication session when the obtaining means falls within NFC communication range of the object, while the communication session is ongoing, and the alternative communication terminal, when the notifying means falls within NFC communication range of the object, returns the communication session by sending a request for return to the communication node, while the redirected communication session is ongoing, the request for return includes the second identifier.

6. The communication terminal according to claim 1, wherein the image comprises at least one of a bar code and a two-dimensional bar code.

7. The communication terminal according to claim 1, wherein the first message is a Session Description Protocol (SDP) message that describes the alternative communication terminal, and the second message is a Session Description Protocol (SDP) message that describes the communication node.

8. The communication terminal according to claim 1, wherein the first identifier comprises a Uniform Resource Identifier of the alternative communication terminal.

9. The communication terminal according to claim 1, wherein the first identifier obtained by the obtaining means is associated with a Uniform Resource Identifier of the alternative communication terminal in a storage, the redirecting means obtains the first message via a mediation node by sending the first identifier to the mediation node and sends the second message via the mediation node by sending the first identifier to the mediation node, and the mediation node retrieves the Uniform Resource Identifier of the alternative communication terminal from the storage based on the first identifier received from the communication terminal and communicates with the alternative communication terminal identified by the retrieved Uniform Resource Identifier.

10. The communication terminal according to claim 1, wherein at least one of the communication terminal and the alternative communication terminal is a mobile terminal.

11. A method for controlling a communication terminal comprising the steps of:
   an establishing step of establishing a communication session with a communication node by sending a request for establishment to the communication node;
   an obtaining step of obtaining a first identifier from an object that is associated with an alternative communication terminal, said first identifier identifying the alternative communication terminal and said object comprising an image which represents the first identifier, wherein the obtaining step further comprises:
   capturing the image as image data; and
   converting the image data into the first identifier;
   a redirecting step of redirecting the communication session to the alternative communication terminal by:
   obtaining, from the alternative communication terminal identified based on the first identifier, a first message that describes the alternative communication terminal,
   sending a request for redirection to the communication node, said request for redirection including the first message,
   receiving, from the communication node, a second message that describes capabilities and session initialization of the communication node, and
   sending the second message to the alternative communication terminal; and
   a regaining step of regaining the communication session from the alternative communication terminal by sending a regaining request to the communication node.

12. The method according to claim 11, wherein the object comprises a memory in which the first identifier is stored,
   the communication terminal comprises a memory reader which retrieves the first identifier from the memory, and
   in the obtaining step the first identifier is obtained via the memory reader.

13. The method according to claim 11, wherein the communication terminal comprises a memory, the object comprises a memory writer which writes the first identifier to the memory, and in the obtaining step the first identifier is obtained via the memory.

14. The method according to claim 11, wherein in the obtaining step, status information is further obtained from the object, the status information indicating whether or not the alternative communication terminal accepts session redirection in the redirecting step, and in the redirecting step the communication session is redirected to the alternative communication terminal if the status information indicates that the alternative communication terminal accepts the session redirection.

15. The method according to claim 11, wherein the image comprises at least one of a bar code and a two-dimensional bar code.

16. The method according to claim 11, wherein the first message is a Session Description Protocol (SDP) message that describes the alternative communication terminal, and the second message is a Session Description Protocol (SDP) message that describes the communication node.

17. The method according to claim 11, wherein the first identifier comprises a Uniform Resource Identifier of the alternative communication terminal.

18. The method according to claim 11, wherein the first identifier obtained in the obtaining step is associated with a Uniform Resource Identifier of the alternative communication terminal in a storage, in the redirecting step the first message is obtained via a mediation node by sending the first identifier to the mediation node and the second message is sent via the mediation node by sending the first identifier to the mediation node, and the mediation node retrieves the Uniform Resource Identifier of the alternative communication terminal from the storage based on the first identifier received from the communication terminal and communicates with the alternative communication terminal identified by the retrieved Uniform Resource Identifier.

19. The method according to claim 11, wherein at east one of the communication terminal and the alternative communication terminal is a mobile terminal.

* * * * *